(12) United States Patent
Scott et al.

(10) Patent No.: US 6,322,827 B1
(45) Date of Patent: Nov. 27, 2001

(54) FEED SUPPLEMENT

(75) Inventors: Trevor William Scott, Kellyville; Suresh Kumar Gulati, Eastwood; John Richard Ashes, Wahroonga, all of (AU)

(73) Assignees: Rumentek Industries PTY Ltd., New South Wales; Commonwealth Scientific and Industrial Research Organisation, Australian Capital Territory, both of (AU)

(*) Notice: Subject to any disclaimer, the term of this patent is extended or adjusted under 35 U.S.C. 154(b) by 0 days.

(21) Appl. No.: 09/462,832

(22) PCT Filed: Jul. 16, 1998

(86) PCT No.: PCT/AU98/00563

§ 371 Date: Apr. 14, 2000

§ 102(e) Date: Apr. 14, 2000

(87) PCT Pub. No.: WO99/03360

PCT Pub. Date: Jan. 28, 1999

(30) Foreign Application Priority Data

Jul. 16, 1997 (AU) .................................. PO 7992
Jul. 16, 1997 (AU) .................................. PO 7995

(51) Int. Cl.[7] .................................. A23K 1/18
(52) U.S. Cl. .................. 426/2; 426/623; 426/630; 426/635; 426/807; 426/656; 426/658
(58) Field of Search .............. 426/2, 658, 807, 426/623, 630, 635, 656

(56) References Cited

U.S. PATENT DOCUMENTS

| | | | |
|---|---|---|---|
| 3,619,200 | * 11/1971 | Ferguson | 99/2 |
| 3,726,971 | 4/1973 | Miller | 424/177 |
| 3,925,560 | * 12/1975 | Scott et al. | 426/2 |
| 3,959,493 | 5/1976 | Baalsrud et al. | 426/2 |
| 4,042,718 | * 8/1977 | Rawlings et al. | 426/573 |
| 4,199,561 | * 4/1980 | Roth et al. | 424/32 |
| 4,533,557 | 8/1985 | Maruyama et al. | 426/61 |
| 5,635,198 | 6/1997 | Nishimura et al. | 424/438 |
| 5,662,958 | * 9/1997 | Kennelly et al. | 426/630 |
| 5,705,206 | * 1/1998 | Ashes et al. | 426/2 |

FOREIGN PATENT DOCUMENTS

| | | |
|---|---|---|
| 71895/74 | 2/1976 | (AU) . |
| 043202 | * 1/1982 | (EP) . |
| 0 168 080 | 1/1986 | (EP) . |
| 2 078 080 | 1/1982 | (GB) . |
| WO94/07376 | 4/1994 | (WO) . |
| WO96/41543 | 12/1996 | (WO) . |

OTHER PUBLICATIONS

"Feruloyl– and zx–Coumaroyl–Carbohydrate Esters from Grass and Cellulose Degradation by Ruminal Microorganisms", D.E. Akin et al., Agronomy Journal, vol. 84, Jul.–Aug. 1992, pp. 613–615.

"Inhibition of Ruminal Deamination in Vitro by Formaldehyde Treatment of Sunflower–Seed, Soya Bean and Fish Meals: Response Curves to Protective Treatment", G. Caja et al., Animal Feed Science and Technology, vol. 2, 1977, pp. 267–275.

"Effects of Processing Method on Degradation Characteristics of Protein and Carbohydrate Sources in Situ", T. Lykos et al., J. Dairy Science, vol. 78, No. 8, Aug. 1995, pp. 1789–1801.

* cited by examiner

Primary Examiner—Chhaya D. Sayala
(74) Attorney, Agent, or Firm—McDermott, Will & Emery

(57) ABSTRACT

The present invention provides a method of improving the growth rate and/or feed conversion efficiency of ruminant livestock during the starter/adaptation phase of feedlotting, wherein said method includes or consists of feeding to the ruminant livestock, protected carbohydrate such that 30–80% of said protected carbohydrate is capable of passing through the rumen undigested leaving 30–80% of said protected carbohydrate available for digestion post-ruminally.

22 Claims, 6 Drawing Sheets

FEED SUPPLEMENT

TECHNICAL FIELD

The present invention relates to the inclusion of feed supplements in the diet of ruminant animals to improve growth rate and/or feed conversion efficiency, and in particular marbling or intra muscular fat deposition.

BACKGROUND ART

The conventional dietetic approach to feedlotting of ruminants is to feed high proportions of grain (>70%) and low proportions of roughage (<20%) in the diet. The aim of this strategy is to maximise the digestibility of the grain and its constituent nutrients including starch and proteins in the rumen. However, there is considerable variation in the starch content of different grains. For example, wheat contains about 70–75% starch, corn and sorghum 68–72% starch, and oats and barley 56–60% starch. Further, there are large differences in the rumen digestibility of starch for the different grains. For example, the starch sources present in wheat and barley are highly digested in the rumen (84–90%) whereas that of sorghum is much lower (60–65%). Such variation in starch content and rumen digestibility results in major differences in feedlot performance and in turn this has significant implications for profitability.

When assessing the nutrient requirements of animals in feedlots it is also necessary to take into account their stage of physiological growth and maturity. For example, at the beginning of beef feedlotting cattle invariably undergo an adaptation phase which involves transition from free range grazing to intensive feedlotting, and commensurately, there is a major change in nutrient supply from a forage to a grain based diet. In effect, this creates an enormous metabolic challenge for the animal and invariably results in compensatory phases of growth occurring. This generally occurs in the first 40–50 days of feedlotting and during this period there is an additional demand for essential amino acids, essential fatty acids and glucose to satisfy intestinal growth and development, which increases during this compensatory/adaptation phase. A further example where different supplies of nutrient are required is in fat deposition and in particular the accumulation of intramuscular fat—a process commonly referred to as marbling.

Smith & Crouse[1] have demonstrated that glucose is the major precursor for fat synthesis in muscle, and this is in contrast to subcutaneous fat deposition where acetate provides the majority of carbon units for long chain fatty acid synthesis. It is also important to note that glucose is the preferred fuel for use by the visceral region of the ruminant species. Therefore, the dietetic challenge is to maximise the end products of rumen fermentation from high grain diets and in addition include protected or bypass feed supplements that increase the supply of specific nutrients, including essential amino acids, essential fatty acids and glucose, to the small intestine for utilisation and absorption.

Australian Patent No. 659 557 discloses the feeding of a supplement containing both protected proteins and protected fats which can be fed in varying ratios to improve growth rate, feed conversion and carcass quality. According to one example the feeding of higher proportions of fat to Hereford cross steers of average weight 470 kg for 175 days increased the fat content by about 10%. Other studies McCartor & Smith[2], McCartor et al.[3], Haaland et al.[4] and Dinius et al.[5] have shown that feeding protected fats without protected proteins will also increase fat content. Similar increases were observed by Zinn[6,7] and Brandt8, when fat supplements not protected from ruminal metabolism were included in the diet.

The increase in fact content occurs mainly in subcutaneous fat, kidney, pelvic, heart and intestinal fat. Variable responses have been found in marbling or intra-muscular fat deposition. For example, McCartor & Smith[2] reported a small increase (P<0.10) in marbling score in Brahman and Hereford steers but in a further study (McCartor et al.[3]) the same group could not demonstrate any significant effect on marbling in 200 steers of mixed breed type. Zinn[6,7] and Brandt[8] also had inconsistent results in improving marbling performance with fat supplementation. Other reports, such as Haaland et al.[4] and Dinius et al.[5] found no differences in carcass quality.

There are also similar variations in marbling and fat deposition when animals are fed conventional grain sources (eg. corn, barley, sorghum, wheat), which are processed prior to feeding. For example, preparing dry rolled corn processed to produce a finer particle size in distribution that is, a geometric mean diameter (G.M.D) 0.76 mm, compared to commercially processed rolled corn (G.M.D >2.6 mm), improved feed conversion and marbling. Furthermore, steam flaked wheat improved daily gain, feed conversion and increased subcutaneous fat deposition, but had no effect on marbling (Owens et al.[9]; Zinn[10]).

The digestion of starch in the small intestine improves energy efficiency by 30–40% (Owens et al.[11]), and also would increase the availability of glucose, either directly or indirectly, for fat synthesis within the muscle. The "trigger" for increased starch digestibility in the small intestine is an increase in activity of the enzymes, that is, amylases and maltases that hydrolyse the glycosidic linkages to produce glucose. Insulin is a key hormone in increasing pancreatic amylase activity, wherein pancreatic amylase is an enzyme critical for starch digestion. Insulin also regulates glucose transport into cells and enhances fat synthesis. Insulin levels can be increased by enhancing the amount of protein digested in the small intestine, and this is achieved by feeding protected proteins. Insulin sensitivity, that is, the binding of this hormone to its receptor on the cell membrane can also be increased by enhancing the $C_{18}$ unsaturated fatty acid composition of the membrane phospholipids. An increase in sensitivity will augment glucose transport and utilisation with the cell. Such metabolic changes are achieved by feeding protected lipids.

The present invention discloses that protected nutrient supplements can be produced to enhance the supply and absorption of essential amino acids, essential fatty acids and glucose to and from the small intestine and these alone, or in combination with each other, increase growth and feed conversion efficiency during the starter/adaptation phase and substantially improve marbling scores of beef cattle. Improved marbling has significant economic implications because of the premium price paid for marbled beef.

OBJECT OF THE INVENTION

An object of the present invention is to provide a method for improving the growth rates and/or feed conversion during the starter/adaptation phases, and improving the marbling scores of ruminant livestock.

DISCLOSURE OF THE INVENTION

According to a first embodiment of the invention there is provided a method of improving the growth rate and/or feed conversion efficiency of ruminant livestock during the starter/adaptation phase of feedlotting, wherein said method includes or consists of feeding to the ruminant livestock, protected carbohydrate such that 30–80% of said protected carbohydrate is capable of passing through the rumen undigested leaving 30–80% of said protected carbohydrate available for digestion post-ruminally.

Typically, 50–80% of protected carbohydrates are capable of passing undegraded through the rumen.

More typically, 60–75% of protected carbohydrates are capable of passing undegraded through the rumen.

According to a second embodiment of the invention there is provided a method of improving the growth rate and/or feed conversion efficiency of ruminant livestock during the starter/adaptation phase of feedlotting, wherein said method includes or consists of feeding to the ruminant livestock, protected carbohydrate produced by the reaction with between 0.1 g and 3 g of formaldehyde per 100 g carbohydrate.

Typically, the protected carbohydrate is produced by the reaction with between 0.5 g and 2.5 g of formaldehyde per 100 g carbohydrate.

More typically, the protected carbohydrate is produced by the reaction with between 1.0 g and 2.5 g of formaldehyde per 100 g carbohydrate.

According to a third embodiment of the invention there is provided a method of improving the growth rate and/or feed conversion efficiency of ruminant livestock during the starter/adaptation phase of feedlotting, wherein said method includes or consists of feeding to the ruminant livestock, protected carbohydrate in accordance with the first and/or second embodiments of the invention, simultaneously with protected protein, such that 50 to 70% of said protected protein is capable of passing through the rumen undigested leaving 50 to 70% of said protected protein is available for digestion post-ruminally.

Typically, the protected protein is produced by the reaction with between 0.05 g and 0.8 g of formaldehyde per 100 g crude protein.

More typically, the protected protein is produced by the reaction with between 0.3 g and 0.7 g of formaldehyde per 100 g crude protein.

Typically, 50–65% of protected protein is capable of passing undegraded through the rumen.

In general, the protected protein is as described in Australian Patent No. 659 557, the disclosure of which is incorporated herein by reference.

According to a fourth embodiment of the invention there is provided a method of improving the growth rate and/or feed conversion efficiency of ruminant livestock during the starter/adaptation phase of feedlotting, wherein said method includes or consists of feeding to the ruminant livestock, protected carbohydrate in accordance with the first and/or second embodiments of the invention, simultaneously with protected lipid, such that 65 to 90% of said protected lipid is capable of passing through the rumen undigested leaving 65 to 90% of said protected lipid available for digestion post-ruminally.

Typically, the protected lipid is produced by the reaction with between 1.5 g and 3 g of formaldehyde per 100 g of crude portion.

More typically, the protected lipid is produced by the reaction with between 2.0 g and 3.0 g of formaldehyde per 100 g of crude portion.

Typically, 75–90% of protected lipid is capable of passing undegraded through the rumen.

In general, the protected lipid is as described in Australian Patents Nos. 450 530 and 659 557, the disclosures of which are incorporated herein by reference.

According to a fifth embodiment of the invention there is provided a method of improving the growth rate and/or feed conversion efficiency of ruminant livestock during the starter/adaptation phase of feedlotting, wherein said method includes or consists of feeding to the ruminant livestock, protected carbohydrate in accordance with the first and/or second embodiments of the invention, simultaneously with protected protein in accordance with the third embodiment of the invention, and protected lipid in accordance with the fourth embodiment of the invention.

Typically, the starter/adaptation phase corresponds to the first 30 to 60 days of the animal being introduced to feedlot conditions.

More typically, the starter/adaptation phase corresponds to the first 40 to 50 days of the animal being introduced to feedlot conditions.

According to a sixth embodiment of the invention there is provided a method of improving the marbling scores of ruminant livestock, wherein said method includes or consists of feeding to the ruminant livestock, protected carbohydrate such that 30–80% of said protected carbohydrate is capable of passing through the rumen undigested leaving 30–80% of said protected carbohydrate available for digestion post-ruminally.

Typically, 50–80% of protected carbohydrates are capable of passing undegraded through the rumen.

More typically, 60–75% of protected carbohydrates are capable of passing undegraded through the rumen.

According to a seventh embodiment of the invention there is provided a method of improving the marbling scores of ruminant livestock, wherein said method includes or consists of feeding to the ruminant livestock, protected carbohydrate produced by the reaction with between 0.1 g and 3 g of formaldehyde per 100 g carbohydrate.

Typically, the protected carbohydrate is produced by the reaction with between 0.5 g and 2.5 g of formaldehyde per 100 g carbohydrate.

More typically, the protected carbohydrate is produced by the reaction with between 1.0 g and 2.5 g of formaldehyde per 100 g carbohydrate.

According to an eighth embodiment of the invention there is provided a method of improving the marbling scores of ruminant livestock, wherein said method includes or consists of feeding to the ruminant livestock, protected carbohydrate in accordance with the sixth and/or seventh embodiments of the invention, simultaneously with protected protein, such that 50 to 70% of said protected protein is capable of passing through the rumen undigested leaving 50 to 70% of said protected protein is available for digestion post-ruminally.

Typically, the protected protein is produced by the reaction with between 0.05 g and 0.8 g of formaldehyde per 100 g crude protein.

More typically, the protected protein is produced by the reaction with between 0.3 g and 0.7 g of formaldehyde per 100 g crude protein.

Typically, 50–65% of protected protein is capable of passing undegraded through the rumen.

In general, the protected protein is as described in Australian Patent No. 659 557, the disclosure of which is incorporated herein by reference.

According to a ninth embodiment of the invention there is provided a method of improving the marbling scores of ruminant livestock, wherein said method includes or consists of feeding to the ruminant livestock, protected carbohydrate in accordance with the sixth and/or seventh embodiments of the invention, simultaneously with protected lipid, such that 65 to 90% of said protected lipid is capable of passing through the rumen undigested leaving 65 to 90% of said protected lipid available for digestion post-ruminally.

Typically, the protected lipid is produced by the reaction with between 1.5 g and 3 g of formaldehyde per 100 g of crude portion.

More typically, the protected lipid is produced by the reaction with between 2.0 g and 3.0 g of formaldehyde per 100 g of crude portion.

Typically, 75–90% of protected lipid is capable of passing undegraded through the rumen.

In general, the protected lipid is as described in Australian Patents Nos 450 530 and 659 557, the disclosures of which are incorporated herein by reference.

According to a tenth embodiment of the invention there is provided a method of improving the marbling scores of ruminant livestock, wherein said method includes or consists of feeding to the ruminant livestock, protected carbohydrate in accordance with the sixth and/or seventh embodiments of the invention, simultaneously with protected protein in accordance with the eighth embodiment of the invention, and protected lipid in accordance with the ninth embodiment of the invention.

Typically, marbling occurs after the starter/adaptation phase.

Preferably, the protected nutrients fed in accordance with any one of the first through to tenth embodiments of the invention do not constitute the entire ration, but may be fed together with any other source of processed or unprocessed feedstuff.

DEFINITIONS

Figure 1:
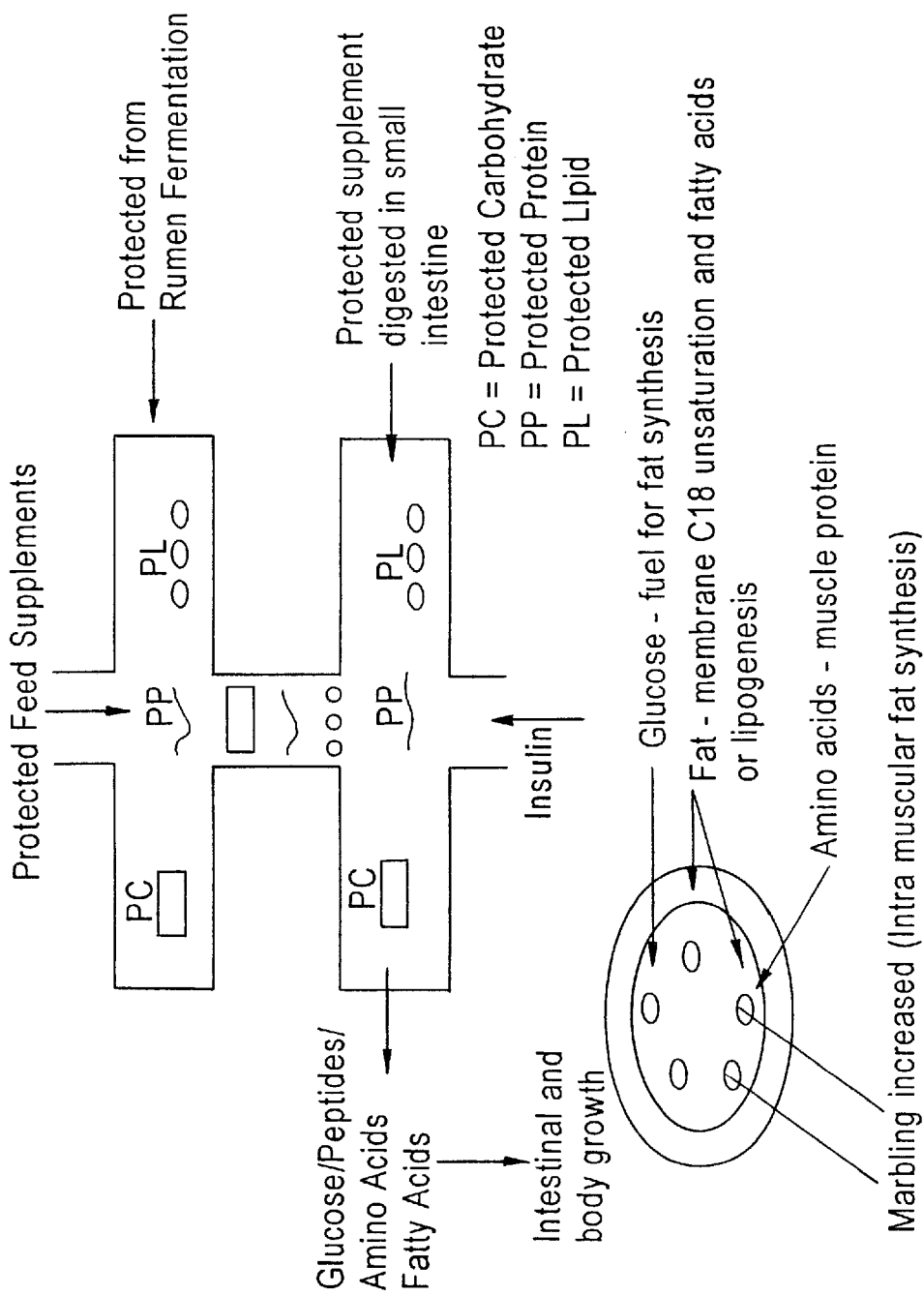
FIG. 1 illustrates a schematic representation of the role of protected nutrients in increasing growth rate, feed efficiency during the starter/adaptation phase, that is, first 40–50 days of feedlotting and marbling or intra muscular fat deposition.

In the context of the present invention, the following terms have the meanings set out below.

In this specification the term "simultaneously" is used to mean feeding of the ruminant livestock within a period of about 24 hours, that is, to realise the benefits of one embodiment of the invention it is not essential that the intake of protected carbohydrate and protected protein, and/or protected lipid takes place at the same time, rather it is important that within a given 24 hour period the animals blood plasma is enriched with carbohydrate, protein and/or lipid constituents by absorption from the abomasum or lower digestive tract.

By "protected" we mean that the nutrient is treated so as not to be fully exposed to the degradative action of the ruminant environment, but available for absorption from the abomasum or lower digestive tract. Suitable techniques should allow accurate control of the amount of cross-linking that occurs between the carbohydrate and protein feedstuffs, and the aldehyde. This may be achieved by varying the amount of aldehyde relative to the carbohydrate or protein content and its amino acid composition, so that the carbohydrate or protein is optimally "protected" from rumen degradation, but may be completely digested and absorbed from the small intestine. For the purposes of this invention the degree of protection from ruminal degradation, that is, the proportion of nutrient supplement which passes undegraded through the rumen, varies according to the nutrient type in question. For example, the optimal degree of carbohydrate protection lies in the range of 50–80%, especially, 60–75%. The degree of protein protection lies in the range 50 to 70%, especially, 60–65%. Dietary lipids can be protected from ruminal metabolism by encapsulation in a matrix of cross-linked proteins, and the preferred window of protection ranges from 65% to 90%, especially 75 to 90%. Lipids are protected by their encapsulation in a matrix of aldehyde treated protein. Importantly, the degree of protection of the formaldehyde-treated protein encapsulating the lipid is much greater than the degree of protection afforded the protein alone. That is, the availability of the protein protecting the lipid is sacrificed to a large extent in order to maintain the lipid beyond the rumen. Thus ensuring that almost all the protected lipid does indeed pass through the rumen undigested, available for digestion within the small intestine.

By "grain" we mean plant derived concentrates, and these include, for example, barley, wheat, oats, sorghum, maize, millet, rice and triticale.

By "carbohydrate" we mean complex carbohydrates such as polyhydroxy aldehydes, ketones, alcohols or acids, their derivatives, and any compound that may be hydrolysed to these.

"Protein" is defined as proteinaceous material containing individual amino acids linked together.

"Fat" is defined as lipid soluble material and normally contains long chain fatty acids of carbon chain length $>C_{10}$.

By "roughage" we mean plant derived cellulose materials containing varying proportions of fibre which are digested at different rates in the rumen.

By "minerals and vitamins" we mean supplement of anions, cations, trace elements and fat-soluble vitamins A, C, D and E that are normally included in feedlot rations.

"Protected carbohydrate" is defined as carbohydrates or carbohydrate containing material that is treated chemically or physically to reduce the rate of degradation in the rumen but allows the carbohydrate to be readily digested in the small intestine. The degree of protection will vary from about 30–80%, that is, about 30–80% of the carbohydrate will pass undegraded through the rumen. In the context of the present invention when protected carbohydrate is fed, a degree of protection of about 50 to about 80% is preferred.

"Protected protein" is defined as proteinaceous material that is treated chemically or physically to reduce the rate of degradation of the constituent amino acids in the rumen. The degree of protection will vary from about 50 to about 70%, that is, about 50 to 70% of the protein will pass undegraded through the rumen. In the context of the present invention when protected protein is fed, a degree of protection of about 50 to about 65% is preferred.

"Protected lipid" is defined as lipid soluble material that normally contains long chain fatty acids and is treated either chemically or physically to reduce its degradation in the rumen, but allows the fatty acids to be available for absorption from the intestine. The degree of protection ranges from about 65 to about 90%, that is, about 65 to about 90% of the lipid supplement wilt pass undegraded through the rumen, and is available for digestion within the small intestine. In the context of the present invention when protected lipid is fed, a degree of protection of about 75 to about 90% is preferred.

"Marbling scores" refer to the amount of intramuscular fat deposition and are assessed in accordance with the criteria of 1 to 12 (1 being very little intramuscular fat and 12 very dense proportions of intramuscular fat) using the AUS-MEAT criteria and classifications[12], the disclosure of which is incorporated herein by reference. The marbling scores quoted in the references hereto are not strictly according to the AUSMEAT criteria and classifications. Those scores are likely to be of the order of 1 or less according to the AUSMEAT criteria and classifications.

Oil seed "meal" refers to oil seed which has had the bulk of the oil or lipid extracted (Example 7), as disclosed in Central and Southeast Asia Tables of Feed Composition. In: International Feedstuff Institute, Utah Agricultural Experiment Station, Utah State University, USA, reference handbook October 1982, and Animal Nutrition, 4th Edn. 1988 (Eds. McDonald, P., Edwards, R.A. & Greenhaigh, J.F.D.) Longman Scientific & Technical, page 455.

"Starter/adaptation phase" refers to the initial period when animals are brought into a feedlotting environment and first exposed to a high grain diet. This period usually occurs in the first 40–50 days of feeding, and during this time there is an increased demand for essential amino acids, essential fatty acids and glucose to satisfy increased intestinal and body growth.

BEST MODES OF CARRYING OUT THE INVENTION

The present invention as represented schematically in FIG. 1 describes how the protection of grain, proteinaceous materials and oilseeds from ruminal degradation and feeding of these supplements containing key nutrients that is, glucose, protein and lipid significantly improves the growth rate and feed conversion efficiency during the starter/adaptation phase, that is, the first 40–50 days of feedlofting, and in general, acts to improve the degree of marbling within the carcass of the ruminant animal.

In the performance of this invention in general, protected carbohydrate is included in the ration at about 20% of dry matter intake. However, it is likely to be most practical to feed animals protected carbohydrate as a supplement which also combines a protected protein and/or a protected lipid.

Surprisingly, the feeding of a combination of a protected carbohydrate and a protected protein and/or a protected lipid, exhibits a substantially greater effect in improving the growth rate and feed conversion efficiency during the starter/adaptation phase of feedlotting, and in general, a substantially greater effect in improving the degree of marbling within the carcass of the ruminant animal, than would have been expected from feeding protected carbohydrate alone.

Typically, these supplements will be fed at the rate of about 20% of the total feedlot ration. If protected carbohydrates used in combination with protected fat and protected protein, a ratio of 70:20:10 w/w/w is used to manufacture the protected feed supplement and it is included in the ration at about 20–25% during the fattening and/or growth phase.

An economically viable source of carbohydrate, protein and lipid is likely to be cereal grain. Sources of such cereal grain are likely to include: barley, maize, oats, wheat, rice, millet, triticale, rye, and sorghum. Other sources of protein may be selected from the group consisting of: sunflower seed meal, cotton seed meal, lupin seed meal and canola seed meal, or mixtures thereof. Further, other sources of lipid may include: oil seed, oil and lipids derived from plants, animals and the by-products of food processing for human consumption. As described by Kirk-Othmer (1980) [13], sources of such oilseeds, oil and lipids include the following: corn, soybean, cotton, lupin, peanut, sunflower, canola, sesame seed oil, olive oil, copra and coconut oil, palm kernels and palm oil, casein, butterfat, lard, fish oils, linseed and oil, tung oil, tallow and yellow grease, or mixtures thereof. This offers the flexibility to select components of the carbohydrate, protein or lipid according to the relative prices and availability of raw materials. There is no particular inherent advantage provided by feeding any one carbohydrate, protein or lipid source which precludes its use over another.

Clearly the benefits possible from practising this invention can be expected to be related to the continuity and period of feeding the protected carbohydrate and to amounts fed, but other factors such as cattle specifications, eg. genotype, age, and physiological condition and the environmental situation (temperature, humidity), should also be taken into account when deciding on the feeding regime to be adopted.

The selection of the source of the carbohydrate, protein and/or lipid to be protected, is dependent on their seasonal availability and price. There is no particular inherent advantage provided by any one carbohydrate, protein and/or lipid source which precludes its use over another.

Preferably protected carbohydrate is included in the ration at about 20% of dry matter intake.

Preferably, where protected carbohydrates are used in combination with protected lipid and protected protein, a ratio of between 45–90:5–35:1–20 w/w/w is used to manufacture the protected feed supplement.

More preferably the ratio of protected carbohydrate:protected lipid:protected protein, is about 65–75:15–25:5–15 w/w/w.

Even more preferably the ratio of protected carbohydrate:protected lipid protected protein, is about 70:20:10 w/w/w.

Preferably the protected feed supplement is included in the ration at about 10–45% during the starting and fattening phases.

More preferably the protected feed supplement is included in the ration at about 15–30% during the starting and fattening phases.

Even more preferably the protected feed supplement is included in the ration at about 20–25% of dry matter intake during the starting and fattening phases.

Preferably, the supplements are fed at a rate of between 1 and 4 kilograms per ruminant animal per day.

More preferably, the supplements are fed at between 1.5 and 3 kilograms per ruminant animal per day.

TEST METHODS a) In-Vitro Biological Evaluation of Feed Supplements
Ruminal Carbohydrate Protection The protection of carbohydrate is determined by the measurement of the residual starch remaining after 24 h in sacco. 5 g of treated or untreated carbohydrate are sealed into 3×5 cm nylon bags (52 μm pore size) which are inserted with appropriate weights in the rumen of a sheep for 24 h. These bags are removed, washed in deionised water and freeze dried and the weight of residue remaining determined. The residues and incubated samples are ground through a mill (containing a 0.5 mm screen) and the starch determined on a 100 mg sub-samples enzymatically using a "Megazyme" total starch assay kit (distributed by Deltagen Australia, 31 Wadhurst Drive, Boronia, Victoria Australia, 3155). All starch values measured are corrected to known standards provided in the kit. The protection of the protected carbohydrate is then calculated as the ratio of the total starch in the untreated and treated sample.

Ruminal Protein Solubility

The release of ammonia during in vitro incubation with rumen fluid is used as a measure of the solubility of the proteins. To 10 mL of strained rumen fluid, sufficient lipid supplement is added to supply 75 mg of protein, and the mixture was incubated anaerobically at 37° C. for 20 h. The reaction flasks including rumen fluid blanks are treated with 5 mL of 0.2M $H_2SO_4$. The mixtures are centrifuged to remove suspended matter, and ammonia is estimated in the supernatant after steam distillations. Net ammonia production is calculated from the difference between the incubated and blank values corrected for ammonia initially present.

Ruminal Hydrogenation of Unsaturated Lipids.

Samples of unsaturated lipid supplements (containing ca. 40–50 mg of oil) are incubated in test tubes with 10 mL of strained rumen fluid. The tubes are flushed with nitrogen, capped with rubber serum caps and incubated in a shaking water bath at 38° C. for periods up to 20 h. The incubated and corresponding unincubated reaction mixtures are saponified and the fatty acids extracted and methylated. The methyl esters are analysed by gas liquid chromatography (GLC), and the extent of protection against ruminal hydrogenation calculated using the formula:

$$\text{Protection } (\%) = \frac{\%\ 18:2\ \text{after incubation}}{\%\ 18:2\ \text{before incubation}} \times 100$$

The endogenous level of polyunsaturated fatty acids in the rumen fluid was always less than 2% by weight of the total fatty acid, and thus had little effect on the above calculations. The hydrogenating capacity of each batch of rumen fluid is verified by incubating the rumen fluid with samples of polyunsaturated oil-casein supplements prepared without formalin.

Ruminal Lipolysis of Triacylglycerol

Samples of the lipid supplements (containing ca. 40–50 mg of lipid) are incubated with 10 mL of strained rumen fluid as described above. When the extent of triacylglycerol (TG) hydrolysis is measured by GLC, heptadecanoic acid (17:0)(20 mg) is added to each reaction tube as an internal standard.

The incubated and corresponding unincubated reaction mixtures are extracted with 10 mL of chloroform-methanol (C/M 2:1 v/v) containing 0.5 mL of 5M HCI. The mixtures of rumen fluid and acidic C/M are vigorously shaken and allowed to stand for 24 h until two phases were clearly distinguished.

The upper aqueous phase is removed and discarded and the lower organic phase filtered to remove suspended matter. The filtrate is evaporated to dryness using rotary film evaporator, and the extent of TG hydrolysis estimated using either thin layer chromatography (TLC), or if 17:0 was added, GLC methods described below.

(i) TLC analysis of the extracted lipids is carried out using silica gel G and a solvent system of petroleum ether: diethyl ether:acetic acid (84:15:1, v/v/v). The separated lipids are visualised by spraying with an ethanolic solution of 2,7-dichlorofluorescein (0.2% w/v) and viewing under UV light. The extent of TG hydrolysis can only be estimated qualitatively by comparing the relative intensities and sizes of the TG and free fatty acid (FFA) spots in both the incubated and the unincubated reaction mixtures.

(ii) GLC analysis is used in conjunction with the 17:0 internal standard to assess the degree of TG lipolysis. This method relies on the determination of the proportion of 17:0 in the FFA fraction of the incubated and the unincubated lipid extracts. The dilution of 17:0 in the FFA fraction which occurs during incubation is used as an index of ruminal lipolysis. The FFA in the lipid extracts are methylated with diazomethane and the methyl esters separated by GLC. In addition, samples of the total lipid extracts are saponified, acidified, and extracted with petroleum ether, and the total fatty acids obtained are also methylated with diazomethane and analysed by GLC. The GLC 17:0 measurements were used to estimate the following values:

TFA $t_0$=Total fatty acids at 0 h

TFA $t_{20}$=Total fatty acids at 20 h

FFA $t_0$=Free fatty acids at 0 h

FFA $t_{20}$=Free fatty acids at 20 h

EFFA $t_0$=Endogenous ruminal free fatty acids at 0 h (from unincubated rumen fluid controls)

EFFA $t_{20}$=Endogenous ruminal free fatty acids at 20 h (from incubated rumen fluid controls).

From these values it was possible to calculate the following two other values:

RFA t0 (released fatty acids at 0 h)=FFA $t_0$−EFFA $t_0$ and

RFA $t_{20}$ (released fatty acids at 20 h)=FFA $t_{20}$−EFFA $t_{20}$

The resistance to ruminal lipolysis is then calculated using the formula:

$$\text{Resistance } (\%) = \frac{TFA\ t_{20} - RFA\ t_{20}}{TFA\ t_0 - RFA\ t_0} \times 100$$

b) In-vivo Biological Evaluation of Supplements

Ruminal Carbohydrate Protection

The protection of carbohydrate is determined by the measurement of the residual starch remaining after 24 h in sacco. 5 g of treated or untreated carbohydrate are sealed into 3×5 cm nylon bags (52 μm pore size) which are inserted with appropriate weights in the rumen of a sheep for 24 h. These bags are removed, washed in deionised water and freeze dried and the weight of residue remaining determined. The residues and incubated samples are ground through a mill (containing a 0.5 mm screen) and the starch determined on a 100 mg sub-samples enzymatically using a "Megazyme" total starch assay kit (distributed by Deltagen Australia, 31 Wadhurst Drive, Boronia, Victoria Australia. 3155). All starch values measured are corrected to known standards provided in the kit. The protection of the protected carbohydrate is then calculated as the ratio of the total starch in the untreated and treated sample.

Ruminal Hydrogenation of Unsaturated Lipids.

This technique is dependent on evidence that the total long chain fatty acids passing from the abomasum is approximately equal to the intake in the diet. Hence the change in concentration of 18:2 and 18:3, gives an approximation of the degree of hydrogenation. The animals are fed basal diets of chopped alfalfa hay and oats (1:1, w/w) 800 g/day. The abomasal digesta is sampled via an abomasal fistula at various time periods and ca. 20 mL of digesta saponified and fatty acids extracted as described for the rumen fluid incubations. The extracted fatty acids are methylated and analysed by GLC. The proportion of polyunsaturated fatty acid (eg., 18:2) in the abomasal lipids is compared with a theoretical level estimated by assuming (a.) that all of the 18:2 in the lipid supplement was protected against ruminal hydrogenation; (b.) that all of the 18:2 in the basal diet was hydrogenated; and (c.) that there was no significant synthesis or degradation of the carbon skeleton of fatty acids by micro-organisms. The in vivo protection of these supplements is calculated using the formula:

$$\% \text{ protection} = \frac{\text{Actual } \% \text{ 18:2 in abomasum}}{\text{Theoretical } \% \text{ 18:2 in abomasum}} \times 100$$

As an example, a sheep receiving 400 g of alfalfa hay, 400 g of crushed oats and 300 g of a formaldehyde treated safflower oil/casein (2:1 w/w) supplement would receive 3% of the basal diet of alfalfa and oats as fatty acids, ie., 24 g, and 178 g of fatty acids from the lipid supplement (corrected for glycerol moiety).

The 18:2 content of the supplementary fatty acids is 75% or 134 g. Using the above assumptions, the content of 18:2 in the abomasal fatty acids should be 134/(178+24)=66%. If the actual 18:2 content of abomasal fatty acids is 53%, then $$\text{the percentage protection} = \frac{53}{66} \times 100 = 80\%.$$

c) Other Chemical Analyses

Moisture content of feed ingredients is determined by heating at 100° C. for at least 12 h. Protein content is determined by the Kjeldahl method. Formaldehyde content of supplements is determined by the method of Van Dooren J. Sci. Food Agric. (1975). 26: 1263.

The invention will now be described in greater detail by reference to specific to examples, which should not be construed as limiting on the scope thereof.

EXAMPLE 1

Protection of Carbohydrate Supplements

Grain was comminuted in a hammer mill to a particle size of approximately 2.5 mm or smaller. Protected carbohydrate was then prepared by spraying 37% (W/V) formaldehyde at the rate of between 0.1 and 3.0 g formaldehyde per 100 g crude carbohydrate into a rapid mixing device containing milled concentrate. This material was then transferred to sealed storage for 10 days to give a protected carbohydrate supplement 30–80% resistant to degradation in the rumen.

(a) Protected Wheat Carbohydrate

Protected wheat carbohydrate was prepared by reacting approximately 1.2 g formaldehyde per 100 g with milled wheat, producing a supplement 65% resistant to degradation in the rumen.

(b) Protected Barley Carbohydrate

Protected barley carbohydrate was prepared by reacting approximately 1.4 g formaldehyde per 100 g with milled barley, producing a supplement 70% resistant to degradation in the rumen.

EXAMPLE 2

Protection of Protein Supplements

Protected protein was prepared by spraying 37% (W/V) formaldehyde at the rate of between 0.05 and 0.8 g formaldehyde per 100 g crude protein into a rapid mixing device containing milled oil seed meal (38% crude protein). This material was then transferred to sealed storage for 10 days to give a supplement 50–70% resistant to proteolysis in the rumen.

(a) Protected Sunflower Protein.

Protected sunflower protein was prepared by reacting approximately 0.7 g formaldehyde per 100 g with milled sunflower seed meal (38% crude protein, 2% crude lipid), producing a supplement 65% resistant to proteolysis in the rumen.

(b) Protected Canola Protein.

Protected canola protein was prepared by reacting approximately 0.5 g formaldehyde per 100 g with milled canola seed meal (38% crude protein, 2% crude lipid), producing a supplement 70% resistant to proteolysis in the rumen.

(c) Protected Lupin Protein.

Protected lupin protein was prepared by reacting approximately 0.6 g formaldehyde per 100 g with milled lupin seed meal (38% crude protein, 5% crude lipid), producing a supplement 65% resistant to proteolysis in the rumen.

(d) Protected Cottonseed Protein.

Protected cottonseed protein was prepared by reacting approximately 0.3 g formaldehyde per 100 g with milled cottonseed seed meal (38% crude protein, 2% crude lipid), producing a supplement 75% resistant to proteolysis in the rumen.

EXAMPLE 3

Protected Lipid Preparation

Cottonseed was coarsely comminuted in a hammer mill and mixed with ethoxyquin (150 ppm on an oil basis). This material was then mixed with water to produce a slurry and, after emulsification of the oil and protein in a colloid stone mill, the caustic soda was added to solublise the oilseed protein. The protein constituents of the homogenised oil seed were cross-linked with 37% (w/v) formaldehyde at the rate of approximately 1.5–3 g formaldehyde per 100 g crude portion to form a gel which was then dried in a pneumatic drier with an average hot air temperature of 300° C. to complete the reaction and produced a protected lipid that was 65–90% resistant to metabolism in the rumen in vitro.

(a) Protected Canola Lipid.

Canola lipid was emulsified with protein, and the protein constituents of the homogenised oil seed were cross-linked with formaldehyde at a rate of approximately 2.5 g formaldehyde per 100 g crude portion producing a supplement that was 75% resistant to metabolism in the rumen in vitro.

(b) Protected Cotton Lipid.

Cotton lipid was emulsified with protein, and the protein constituents of the homogenised oil seed were cross-linked with formaldehyde at a rate of approximately 3.0 g formaldehyde per 100 g crude portion producing a supplement that was 80% resistant to metabolism in the rumen in vitro.

(c) Protected Cotton—Soybean/Tallow Lipid.

Canola/Soybean/Tallow lipid was emulsified with protein, and the protein constituents of the homogenised oil seed were cross-linked with formaldehyde at a rate of approximately 2.5 g formaldehyde per 100 g crude portion producing a supplement that was 80% resistant to metabolism in the rumen in vitro.

EXAMPLE 4

Feeding Trials

Figure 2A:
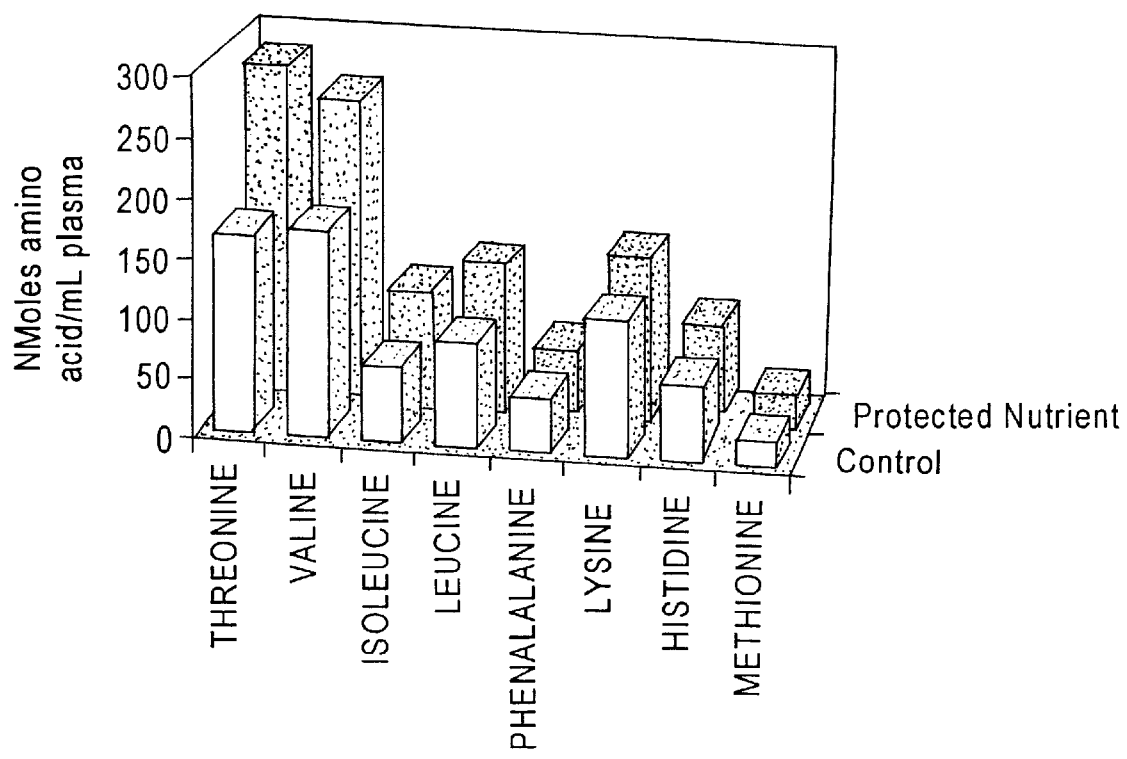
FIGS. 2(a)–2(c) illustrates the effect of protected nutrients on essential amino acids of blood in sheep when fed (a) protected sunflower seed meal, (b) protected cotton seed lipid and (c) Protected sunflower seed meal plus protected wheat plus protected canola soybean lipid (0.1:1:1, w/w/w).
Figure 2B:
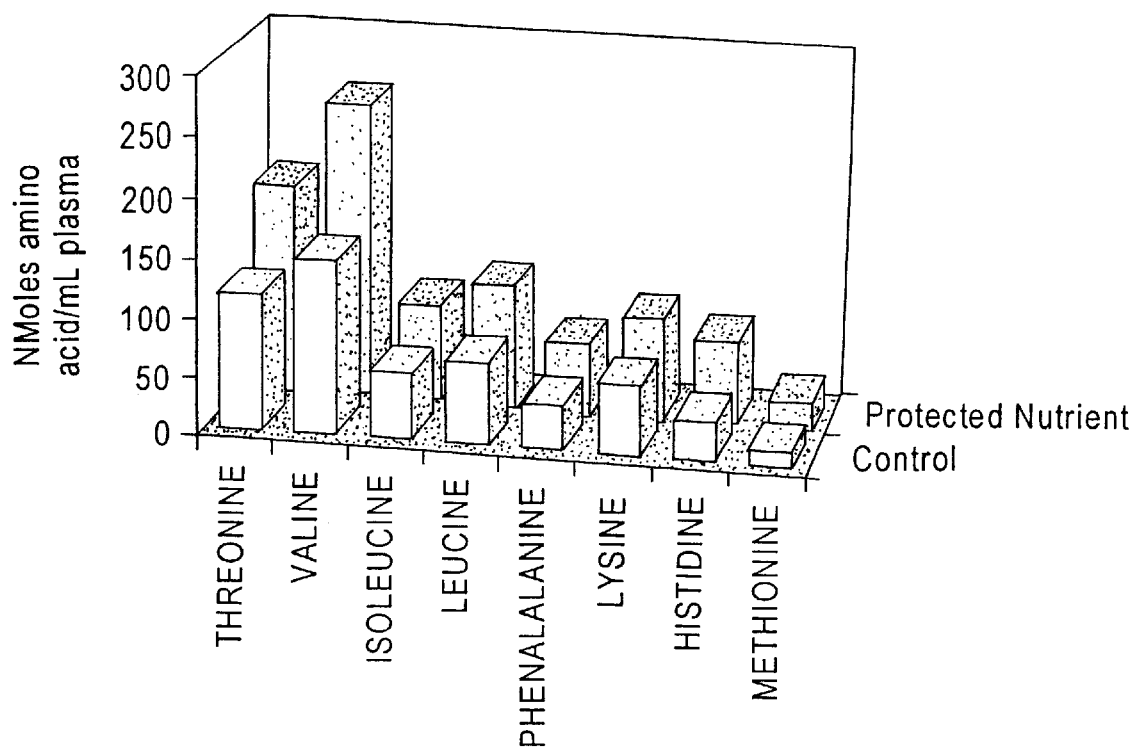
Figure 2C:
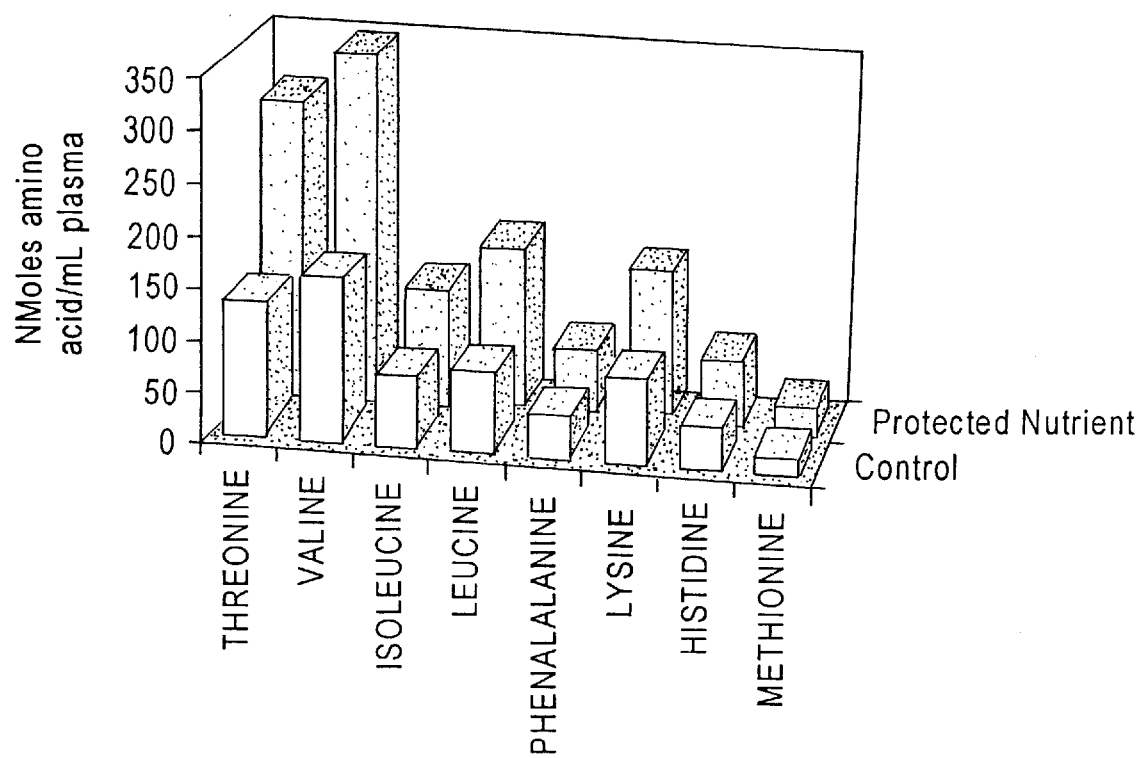

The following example describes the effects on essential amino acid content of blood of feeding the following dietary supplements:

a) Protected sunflower meal protein b) Protected cotton seed lipid c) Protected sunflower seed meal protein plus protected wheat (carbohydrate) plus protected canola/soybean lipid Sheep receiving 900 g of lucerne chaff and oats (60:40, w/w) were fed daily supplements of protected sunflower seed meal (150 g/d), protected cotton seed lipid (150 g/d) and protected sunflower seed meal plus protected wheat plus protected canola/soybean lipid (200 g/d; 1:1:0.1 w/w). Blood samples were analysed for essential amino acids on the fourth day after the commencement of the dietary supplements. FIGS. 2a, 2b and 2c below demonstrate that feeding supplements containing protected nutrients alone or in combination increases the essential amino acid content of plasma in ruminants. This provides further evidence that these nutrients are protected from ruminal metabolism, are available to and digested from the small intestine.

EXAMPLE 5

Feeding Trials

The following example describes the effects on the essential fatty acid content of blood of feeding the following dietary supplements:

a) Protected cotton seed lipid b) Protected canola/soybean lipid plus protected wheat (carbohydrate) plus protected sunflower seed meal (1:1:0.1, w/w/w)

Figure 3A:
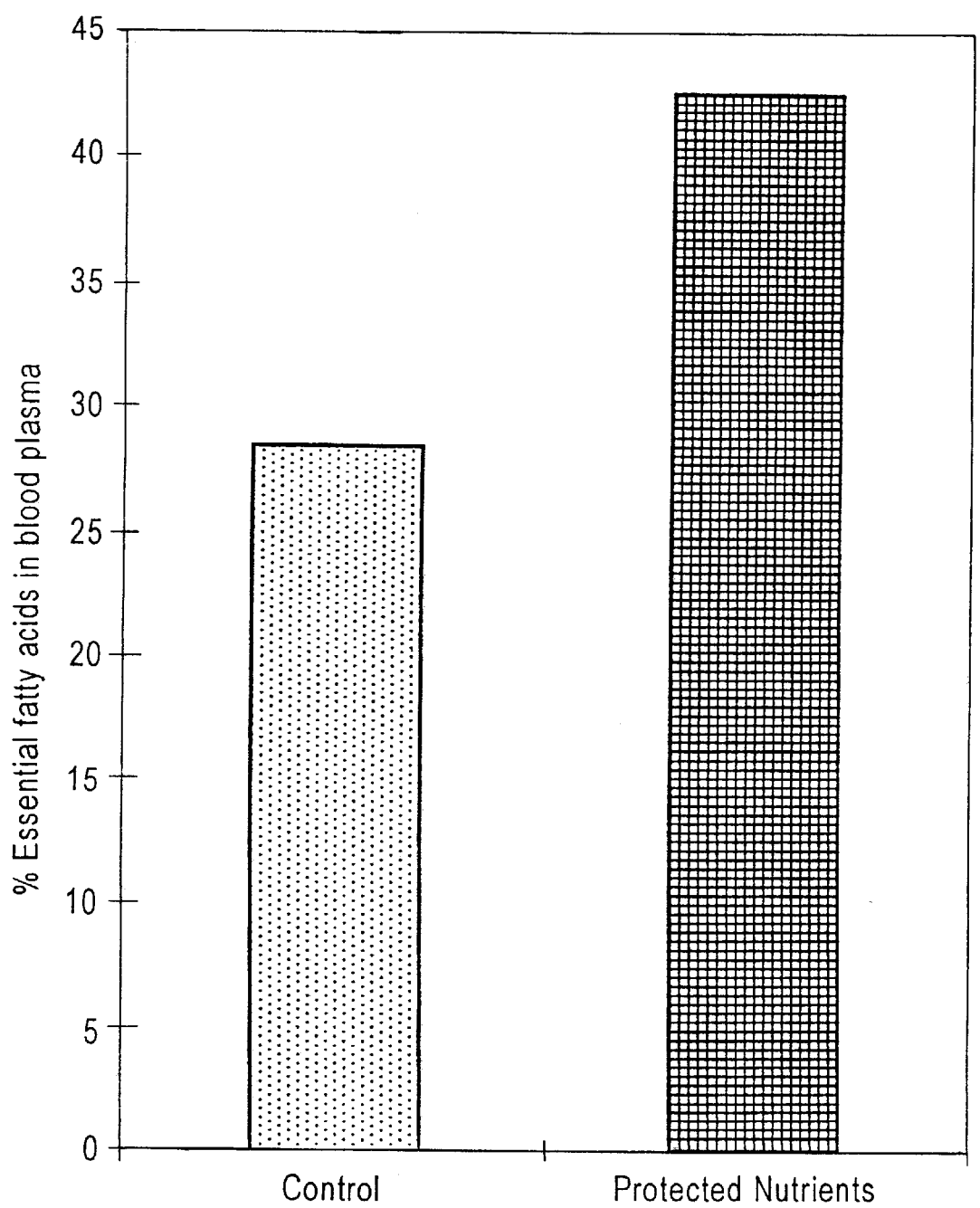
FIGS. 3(a)–3(b) shows the effect of protected nutrients on essential fatty acids of blood in sheep when fed (a) protected cotton seed lipid—linoleic acid and (b) protected sunflower seed meal plus protected wheat plus protected canola soybean lipid (0.1:1:1, w/w/w)—linoleic and linolenic acids combined.
Figure 3B:
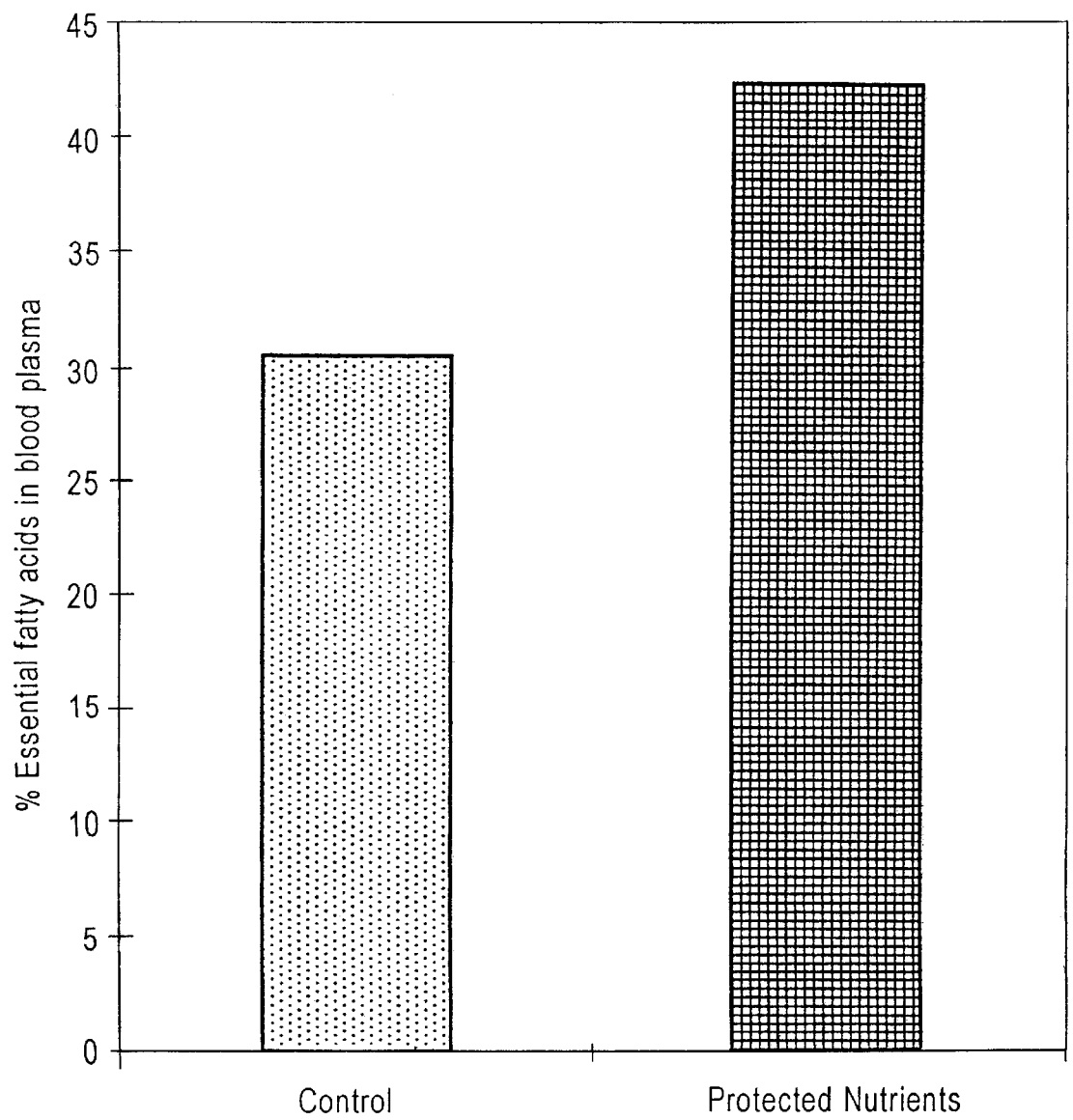

Sheep receiving 900 g of lucerne chaff and oats (60:40; w/w) were fed daily supplements of protected cotton seed lipid (150 g/d), protected sunflower seed meal plus protected wheat plus protected canola/soybean lipid (200 g/d; 1:1:0.1 w/w). Blood samples were analysed for essential fatty acids on the fourth day after the commencement of the dietary supplements. FIGS. 3a and 3b below demonstrate that feeding supplements containing protected nutrients alone or in combination increase the essential n-3 and n-6 fatty acids content of plasma in ruminants. This provides further evidence that these nutrients are protected from ruminal metabolism, are available to and digested from the small intestine.

EXAMPLE 6

Beef feeding trial—effect of feeding protected nutrients on growth and feed conversion during the starter/adaptation phase (0–40 days) and marbling.

Murray grey cattle (initial liveweight 500–600 kg) were fed a ration containing 60% grain, 10% silage, 8% hay, 20% protected nutrients (combination of protected canola/soybean lipid, protected wheat (carbohydrate) and protected sunflower seed meal; 1:1:0.1, w/w/w) and 2% mineral/vitamin mix.

During the starter/adaptation phase (first 40 days), the protected nutrients increased growth rate and feed efficiency by approximately 10%. Feeding the protected nutrients for a period of 120 days increased the marbling or intramuscular fat deposition by 10–20%.

EXAMPLE 7

The following table outlines the chemical composition of protected lipid and protected protein supplements.

|  | % Dry Matter | % Protein | % Fat |
|---|---|---|---|
| Protected Protein Meal |  |  |  |
| Sunflower | 92 | 43 | 1.9 |
| Cotton | 89 | 44 | 2 |
| Lupin | 92 | 34 | 2.2 |
| Soybean | 85 | 53 | 2.3 |
| Canola | 91 | 39 | 2 |
| Protected Lipid Supplement |  |  |  |
| Cotton | 94 | 37 | 36 |
| Canola/Soybean | 84 | 32 | 39 |
| Canola | 92 | 29 | 36 |
| Canola/Soybean/Tallow | 92 | 28 | 49 |

All values expressed on a dry matter basis

This table clearly demonstrates the negligible amount of fat present in a protected protein meal. Furthermore, the protein present in the protected lipid supplement is that which encapsulates the lipid, thereby providing protection from the rumen environment.

Similarly, protected carbohydrate may be prepared from a ground cereal grain, such as wheat, which comprises less than 2% lipid. Further, the lipid fraction present in the carbohydrate is not emulsified and encapsulated in a protected protein matrix, and thus is itself not protected from ruminal degradation.

INDUSTRIAL APPLICABILITY

The present invention makes use of nutritional materials protected against rumen degradation, but offers the possibility of improving the growth rate, feed efficiency and marbling scores significantly in excess of that previously reported. Additionally, the invention offers considerable scope for modifying carcass fat/protein ratios to meet market requirements. Practise of this invention can be expected to offer economic benefits irrespective of the type of animal in question.

REFERENCES

1. Smith SB & Crouse JD. Relative contributions of acetate, lactate and glucose to lipogenesis in bovine intramuscular and subcutaneous adipose tissue (1984) J. Nutr. 114 p792–800.
2. McCartor & Smith, "Effect of Protected Lipids on Feedlot Performance and Carcass Characteristics of Short-Fed Steers" J. An. Sci. (1978) Vol. 47, P 270.
3. McCartor et al, "Substitution of a Protected Tallow Product for Grain Sorghum in the Diet of Fattening Steers fed for 89 or 118 Days" J. An. Sci. (1979) Vol. 48, P 1057.
4. Haaland et al, "Effect of Replacement of Corn by Protected Tallow in a Cattle Finishing Diet on Animal Performance and Composition" J. An. Sci. (1981) Vol. 52, P 696.
5. Dinius et al, "Finishing Beef Steers on Forage Diets with Additives and Supplemental Lipid" J. An. Sci. (1978) Vol. 46, P 761.
6. Zinn, "Comparative Feeding Value of Supplemental Fat in Finishing Diets for Feedlot Steers Supplemented With and Without Monensin" J. An. Sci. (1988) Vol. 66, P 213.
7. Zinn, "Influence on Level and Source of Dietary Fat on Its Comparative Feeding Value in Finishing Diets for Steers: Feedlot Cattle Growth and Performance" J. An. Sci. (1989) Vol. 67 P 1029.
8. Brandt et al, "Supplemental Fat Source Affects Feedlot Performance and Carcass Traits of Finished Yearling Steers and Estimated Diet Net Energy Value" J. An. Sci (1990) Vol. 68, P 2208.
9. Owens et al. J. Anim. Sci. (1986) 72. Suppl. 1.
10. Zinn R. J. Anim. Sci. (1994) 72 21–28.
11. Owens et al. J. Anim. Sci. (1986) 63 p1634–1648.
12. Chiller Assessment Guide, AUSMEAT, March 1991
13. Kirk-Othmer (1980). Encyclopedia of Chemical Technology Third Ed. Vol. 9:821.

What is claimed is:

1. A method of improving the growth rate and/or feed conversion efficiency of ruminant livestock during the starter/adaptation phase of feedlotting, wherein said method comprises feeding the ruminant livestock protected carbohydrate such that 30–80% of said protected carbohydrate is capable of passing through the rumen undigested leaving 30–80% of said protected carbohydrate available for digestion post-ruminally.

2. The method according to claim 1 wherein 50–80% of protected carbohydrate is capable of passing undegraded through the rumen.

3. A method of improving the growth rate and/or feed conversion efficiency of ruminant livestock during the starter/adaptation phase of feedlotting, wherein said method comprises feeding the ruminant livestock protected carbohydrate, wherein said protected carbohydrate is produced by the reaction with between 0.1 g and 3 g of formaldehyde per 100 g carbohydrate.

4. The method according to claim 1, further comprising simultaneously feeding to the ruminant livestock protected protein, such that 50 to 70% of said protected protein is capable of passing through the rumen undigested leaving 50 to 70% of said protected protein available for digestion post-ruminally.

5. The method according to claim 1, further comprising simultaneously feeding the ruminant livestock protected lipid, such that 65 to 90% of said protected lipid is capable of passing through the rumen undigested leaving 65 to 90% of said protected lipid available for digestion post-ruminally.

6. The method according to claim 1, further comprising simultaneously feeding the ruminant livestock protected protein and protected lipid, such that 50 to 70% of said protected protein is capable of passing through the rumen undigested leaving 50 to 70% of said protected protein available for digestion post-ruminally, and 65 to 90% of said protected lipid is capable of passing through the rumen undigested leaving 65 to 90% of said protected lipid available for digestion post-ruminally.

7. A method of improving the marbling scores of ruminant livestock, wherein said method comprises feeding the ruminant livestock protected carbohydrate such that 30–80% of said protected carbohydrate is capable of passing through the rumen undigested leaving 30–80% of said protected carbohydrate available for digestion post-ruminally.

8. The method according to claim 7, wherein 50–80% of protected carbohydrate is capable of passing undegraded through the rumen.

9. A method of improving the marbling scores of ruminant livestock, wherein said method comprises feeding the ruminant livestock protected carbohydrate, wherein said protected carbohydrate is produced by the reaction with between 0.1 g and 3 g of formaldehyde per 100 g carbohydrate.

10. The method according to claim 7, further comprising simultaneously feeding the ruminant livestock protected protein, such that 50 to 70% of said protected protein is capable of passing through the rumen undigested leaving 50 to 70% of said protected protein available for digestion post-ruminally.

11. The method according to claim 7, further comprising simultaneously feeding the ruminant livestock protected lipid, such that 65 to 90% of said protected lipid is capable of passing through the rumen undigested leaving 65 to 90% of said protected lipid available for digestion post-ruminally.

12. The method according to claim 7, further comprising simultaneously feeding the ruminant livestock protected protein and protected lipid, such that 50 to 70% of said protected protein is capable of passing through the rumen undigested, leaving 50 to 70% of said protected protein available for digestion post-ruminally, and 65 to 90% of said protected lipid is capable of passing through the rumen undigested, leaving 65 to 90% of said protected lipid available for digestion post-ruminally.

13. The method of claim 5, wherein said protected protein is produced by the reaction with between 0.05 g and 0.8 g of formaldehyde per 100 g crude protein.

14. The method of claim 5, wherein said protected lipid is produced by the reaction with between 1.5 g and 3.0 g of formaldehyde per 100 g crude lipid.

15. A method according to claim 1, wherein the source of carbohydrate is cereal grain.

16. A method according to claim 4, wherein the source of protein is cereal grain.

17. A method according to claim 5, wherein the source of lipid is cereal grain.

18. A method according to claim 15, wherein said cereal grain is selected from the group consisting of: barley, corn, oats, wheat, rice, millet, triticale, rye, and sorghum, or a mixture thereof.

19. The method according to claim 4, wherein the source of protein is selected from the group consisting of: sunflower seed meal, cotton seed meal, lupin seed meal and canola seed meal, or a mixture thereof.

20. The method according to claim 5, wherein the source of lipid is selected from the group consisting of: soybean, cotton, lupin, peanut, sunflower, canola, sesame seed, copra, coconut, palm kernels and linseed, or a mixture thereof.

21. The method according to claim 5, wherein the source of lipid is selected from the group consisting of: casein, butterfat, yellow grease, lard, fish oils, tung oil, and tallow, or a mixture thereof.

22. The method according to claim 1, further comprising feeding the ruminant livestock any other source of processed or unprocessed feedstuff.

* * * * *